United States Patent
Shiflett, Jr.

(10) Patent No.: US 9,986,725 B2
(45) Date of Patent: Jun. 5, 2018

(54) COMBINATION PADDLE SHAFT AND FISHING ROD

(71) Applicant: Ronald C. Shiflett, Jr., Midlothian, VA (US)

(72) Inventor: Ronald C. Shiflett, Jr., Midlothian, VA (US)

( * ) Notice: Subject to any disclaimer, the term of this patent is extended or adjusted under 35 U.S.C. 154(b) by 145 days.

(21) Appl. No.: 15/245,497

(22) Filed: Aug. 24, 2016

(65) Prior Publication Data
US 2017/0055508 A1    Mar. 2, 2017

Related U.S. Application Data

(60) Provisional application No. 62/251,515, filed on Nov. 5, 2015, provisional application No. 62/238,799, filed on Oct. 8, 2015, provisional application No. 62/209,436, filed on Aug. 25, 2015.

(51) Int. Cl.
| | | |
|---|---|---|
| *A01K 99/00* | (2006.01) | |
| *A01K 87/00* | (2006.01) | |
| *A01K 87/06* | (2006.01) | |
| *A01K 97/10* | (2006.01) | |
| *B63H 16/04* | (2006.01) | |

(52) U.S. Cl.
CPC ............ *A01K 87/007* (2013.01); *A01K 87/06* (2013.01); *A01K 97/10* (2013.01); *B63H 16/04* (2013.01); *B63B 2741/00* (2013.01)

(58) Field of Classification Search
CPC ...... A01K 99/00; A01K 87/009; A01K 97/10; B63H 16/04
See application file for complete search history.

(56) References Cited

U.S. PATENT DOCUMENTS

| 3,039,120 | A |   | 6/1962  | Powell et al. |
|-----------|---|---|---------|----------------|
| 5,577,338 | A |   | 11/1996 | Matsumoto et al. |
| 5,913,671 | A |   | 6/1999  | Fernandez et al. |
| 6,393,753 | B1 |  | 5/2002  | Walker |
| 9,884,236 | B2 | * | 2/2018 | Gurney ................. A63B 67/007 |
| 2009/0211142 | A1 | * | 8/2009 | Sackett .................. A01K 87/02 43/21.2 |
| 2014/0050584 | A1 | * | 2/2014 | Lange ................... B63H 16/04 416/146 R |
| 2015/0150232 | A1 | * | 6/2015 | Mora ..................... A01K 97/10 43/17 |
| 2015/0327530 | A1 | * | 11/2015 | Langley ................ A01K 99/00 43/26 |

(Continued)

FOREIGN PATENT DOCUMENTS

EP     2387880     3/2013

*Primary Examiner* — Christopher P Ellis
(74) *Attorney, Agent, or Firm* — Marsh Fischmann & Breyfogle LLP; Russell T. Manning

(57) ABSTRACT

A combination paddle and fishing rod device is disclosed. The device may incorporate a single ended paddle or double ended paddle. In any embodiment, the device allows a fishing reel to be mounted to the shaft of the paddle. The shaft forms a portion of the fishing rod supporting one or more eyelets for guiding fishing line from a fishing reel mounted to the shaft. In one embodiment, the eyelets are connected to the shaft and or an oar blade. In another embodiment, a short fishing rod section having one or more eyelets is connected to the shaft. The device is configured to permit fishing while a user propels a watercraft.

9 Claims, 12 Drawing Sheets

(56) References Cited

U.S. PATENT DOCUMENTS

2016/0069511 A1\* 3/2016 Gurney ................ B63H 16/04
                                                        473/517
2017/0015392 A1\* 1/2017 Johnson ............... B63H 16/04
2017/0142946 A1\* 5/2017 Lockwood ............ B63H 16/04

\* cited by examiner

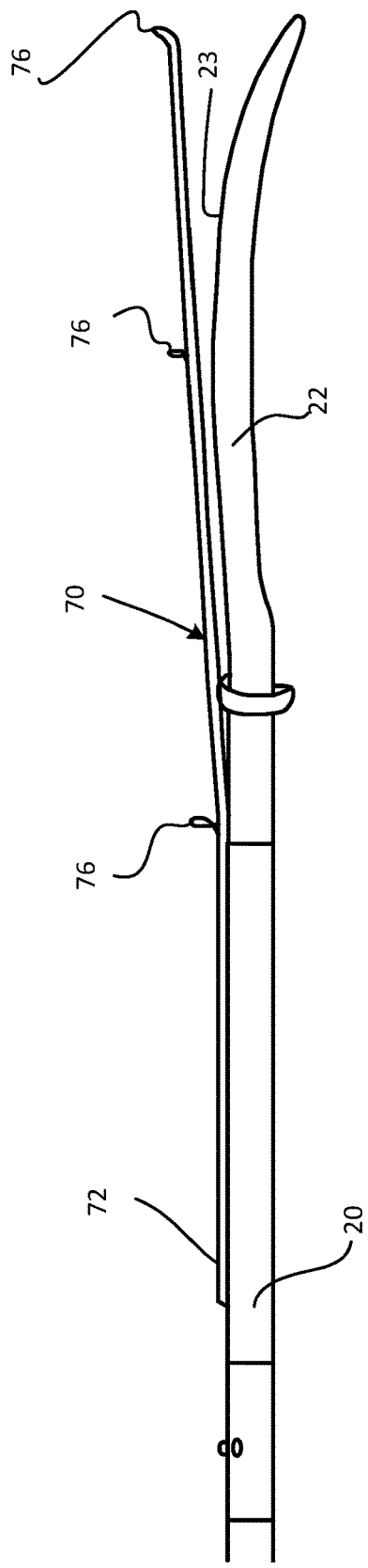
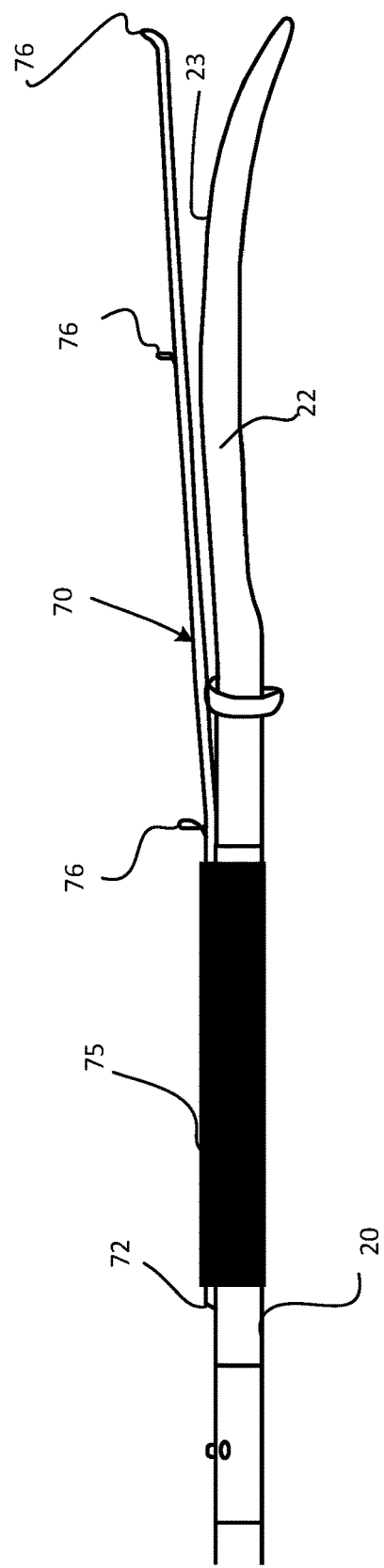
FIG. 8A
FIG. 8B

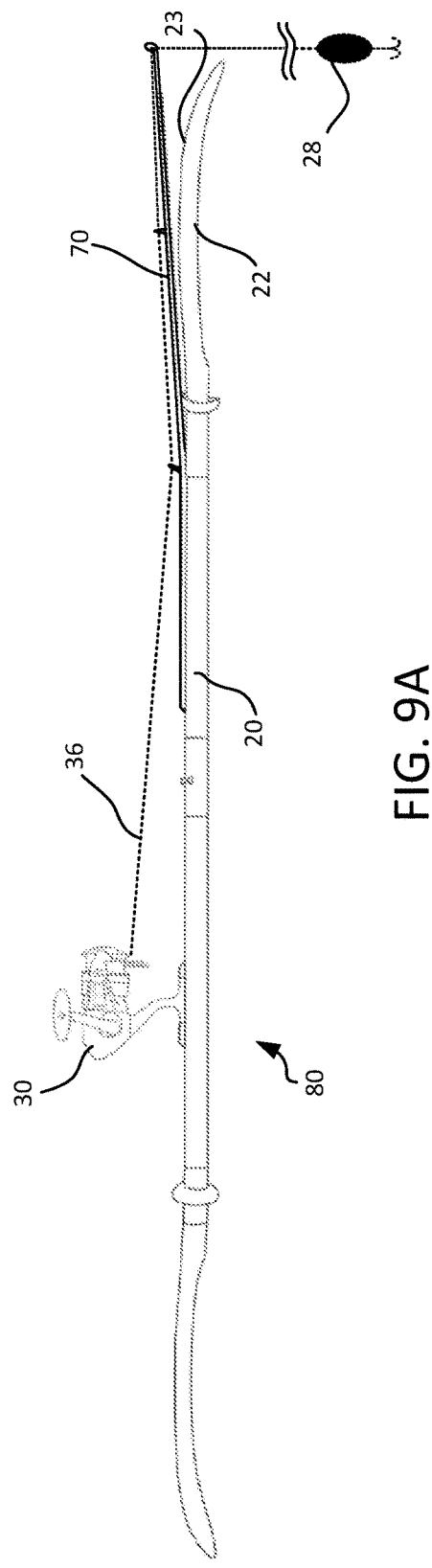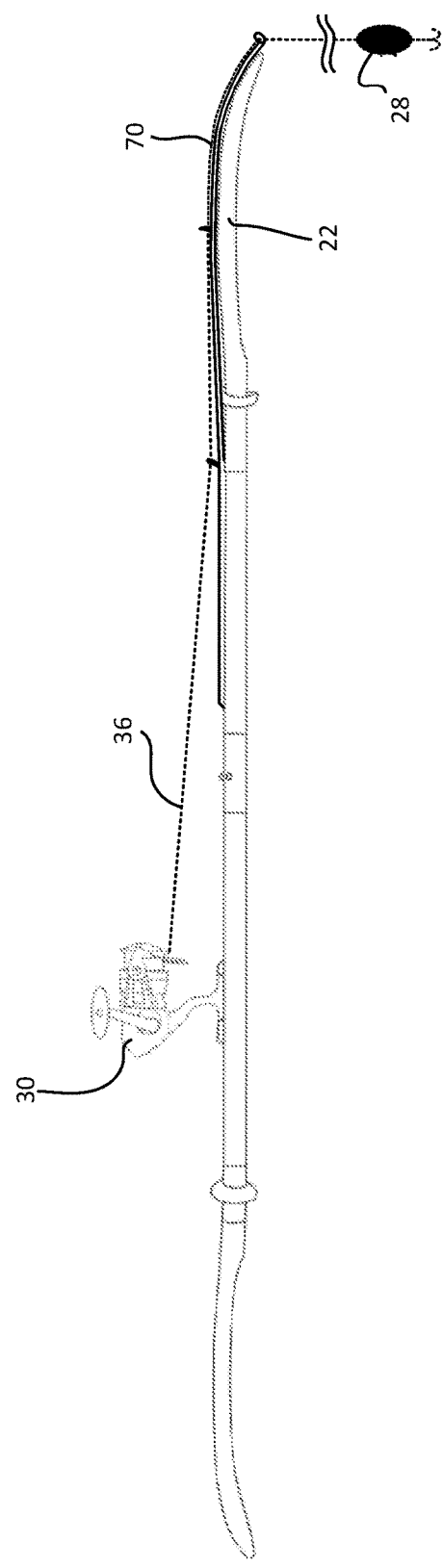
FIG. 9A
FIG. 9B

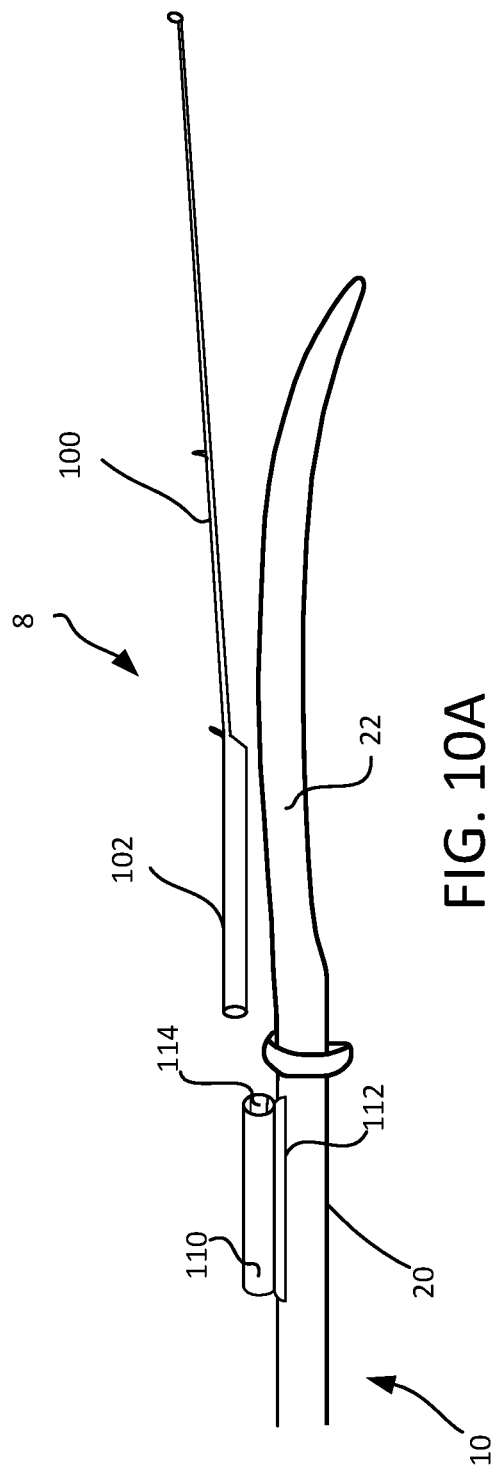
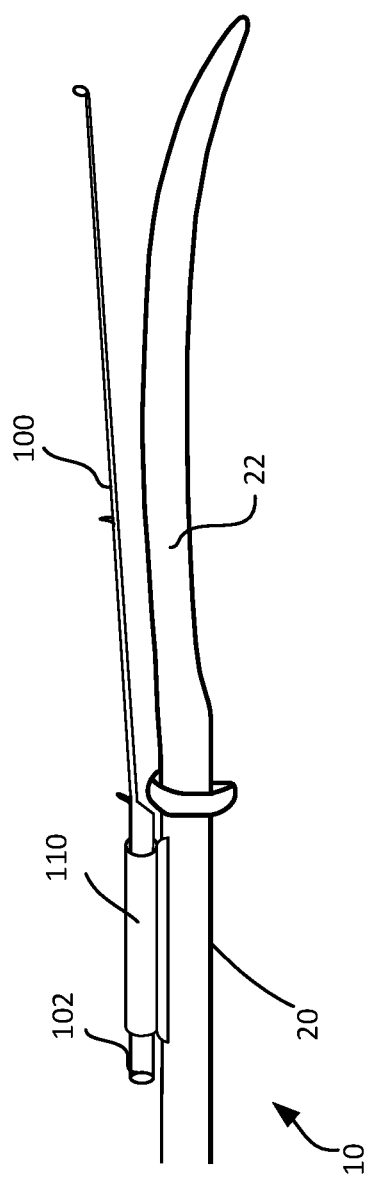
FIG. 10A
FIG. 10B

COMBINATION PADDLE SHAFT AND FISHING ROD

CROSS REFERENCE

The present application claims the benefit of the filing dates of: U.S. Provisional Patent Application No. 62/209,436 having a filing date of Aug. 25, 2015; U.S. Provisional Patent Application No. 62/238,799 having a filing date of Oct. 8, 2015; and U.S. Provisional Patent Application No. 62/251,515 having a filing date of Nov. 5, 2015, the entire contents of all of which are incorporated herein by reference.

FIELD

The present disclosure is directed to a paddle/oar shaft suitable for use with a kayak, canoe or other watercraft, which incorporates a fishing reel seat to allow a user to connect a fishing reel to the paddle shaft. The device allows a user to, at the same time, paddle a water craft and troll for fish, or to use the shaft for fishing or netting fish independent of a paddling action.

BACKGROUND

Kayaking is becoming an increasingly popular paddle sport. As of 2013, there are 13 million U.S. kayakers and 10 million U.S. canoeists. International-based paddlers in the EU, South America, Africa & Asia may equal these numbers. When kayaking and canoeing, a paddler typically sits in a low-to-the-water vessel facing forward, legs in front, using a single or double-bladed paddle to pull front-to-back on one side and then the other in rotation. Kayaks and canoes have open or closed decks, although sit-on-top and inflatable kayaks are growing in popularity.

Often, users of kayaks and similar watercraft wish to fish while paddling. Along these lines, a number of kayaks incorporate rod holder(s) that allow mounting a fishing rod to the kayak. Many older kayak designs rely on bungee straps to secure fishing rods behind the seated operator. In such an arrangement, a user may play out a length of fishing line having a baited hook or lure, place the end of the fishing rod within the rod holder and begin paddling. This allows a user to troll for fish while paddling. However, tending the fishing rod while paddling is often cumbersome and lessens the chance of hooking a fish when the fish strikes the trailing hook/lure. Such multitasking with two platforms (paddle and rod) also increases the probability of hook related snags and punctures of the fisherman. Such dual platforms require multitasking demands, which impacts personal labor, observation, stability and safety awareness.

SUMMARY

The present disclosure is directed to a paddling device for propelling a watercraft through water and for supporting a fishing reel. More specifically, a fishing reel mount is incorporated with a shaft suitable for a single or double ended paddle. Aspects of the presented disclosure are directed to its simplicity and design elegance. Additional aspects are directed to higher efficiency and safety in a marine environment that is achieved from merging paddling and fishing functions into one performance platform, as opposed to two individual platforms.

In one aspect, a combination paddle and fishing rod device is disclosed, which is generally directed to a single or double ended paddle having one or two oar blades attached to an oar shaft. The double ended paddle configuration allows a fishing reel to be mounted to the shaft between opposing oar blades. When disposed in such a location, the reel may be disposed between the hands of a user allowing the user to utilize the paddle while simultaneously fishing. In order to extend fishing line over the edge of the boat while a user is paddling, fishing line from a reel mounted to the shaft extends along the shaft to one of the oar blades. In one arrangement, the line extends within a recessed portion of the shaft. That is, the shaft has a recessed channel that extends over a portion of the length of the shaft (e.g., from at least a first location near the center of the shaft to second location near one of the oar blades). Further, one or more ferrules may extend over this recessed channel to maintain the fishing line therein. This 'open channel' design allows for easy insertion and removal of fishing line filament, facilitates visual inspection of the line, and facilitates physical manipulation of the line to remove debris and foreign matter associated with fresh water and salt water environments.

The use of the recessed channel along the length of all or a portion of the shaft provides another important benefit. Specifically, the shaft remains watertight. That is, as opposed to prior art combination paddles/rods, which utilize a tube in tube construction that can result in water intrusion and a significant increase in apparatus weight, the presented system results in almost no additional weight to the paddle. In the present aspect, if water infiltrates the open recessed channel, it spills out immediately. In contrast, water seepage into an internal tube system could add 1-3 pounds of additional water weight to a paddle, doubling the weight of the paddle. When not in use, users may remove the reel and use the paddle in standard fashion.

In another aspect, a combination paddle and fishing rod device is disclosed, which is generally directed to a single ended paddle or double ended paddle. The double ended paddle configuration allows a fishing reel to be mounted to the shaft between opposing oar blades. To maintain the fishing line along the paddle shaft, one or more line guides or eyelets are attached to the oar blade and/or along the length of the shaft. In one arrangement, a first eyelet is attached proximate to where the shaft connects to an oar blade and a second eyelet is attached proximate to a distal tip of the oar blade. In such an arrangement, flexibility of the blade may provide some give or play for the combination fishing device.

In another aspect, a short fishing rod section having two or more guides/eyelets is attached to a shaft of a paddle. Typically, the rod tapers from a rearward section (e.g., butt end) to a tip end, though this is not a requirement. The rearward section is affixed to an outward portion of the shaft (e.g., relative to a middle of the shaft) and the tip end extends over at least a portion of the oar blade. The tip end may extend near to the end of the blade, to the end of the blade or beyond the end of the blade. The fishing rod section may be made of any appropriate materials including, without limitation, graphite, boron and fiberglass composites.

In another aspect, a short fishing rod section is selectively attachable to a shaft of a paddle. In this aspect, the fishing rod section may be removed from the shaft when not in use. Further, such an arrangement allows a user to select the weight (e.g., stiffness) of the fishing rod section and/or a length of the fishing rod section. In one arrangement, a receiving socket or ferrule, affixed to the shaft, is configured to receive and secure the fishing rod section. Any appropriate connection between the between the socket and the fishing rod section to allow selective connection there between. Such connections include, without limitation, interference fit, push button connectors and clamps to name a few.

In another aspect, a combination paddle and fishing rod/pole is disclosed, which is generally directed to a single paddle or double ended paddle. In this aspect, connectors are attached to the shaft of the oar that allows for mounting an existing fishing pole substantially parallel to the oar shaft. In such an arrangement, fisherman may utilize their existing fishing rods which conveniently connect to the oar shaft to permit paddling after casting. If a fish strikes, the user may quickly remove the rod from the connectors. In one non-limiting embodiment, the connectors are snap connectors that deflect outward and around a handle and/or rod section of the fishing pole and receive the handle/rod within an aperture in a snap fit arrangement. However, other connectors may be utilized. For instance, two piece mating connectors may be utilized where a first piece of each connector is mounted to the pole and a second connector attaches to the oar shaft. Any releasable engagement between the two pieces may be utilized.

BRIEF DESCRIPTION OF THE DRAWINGS

For a more complete understanding of the present invention and further advantages thereof, reference is now made to the following detailed description taken in conjunction with the drawings in which:

FIGS. 8A and 8B illustrate close-up views of the rod section and paddle of FIG. 7.

FIGS. 9A and 9B illustrate the combination paddle and fishing rod of FIG. 7 in use.

FIGS. 10A and 10B illustrate another embodiment of a combination paddle and fishing rod with a removable rod portion.

DETAILED DESCRIPTION

Reference will now be made to the accompanying drawings, which assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Figure 1:
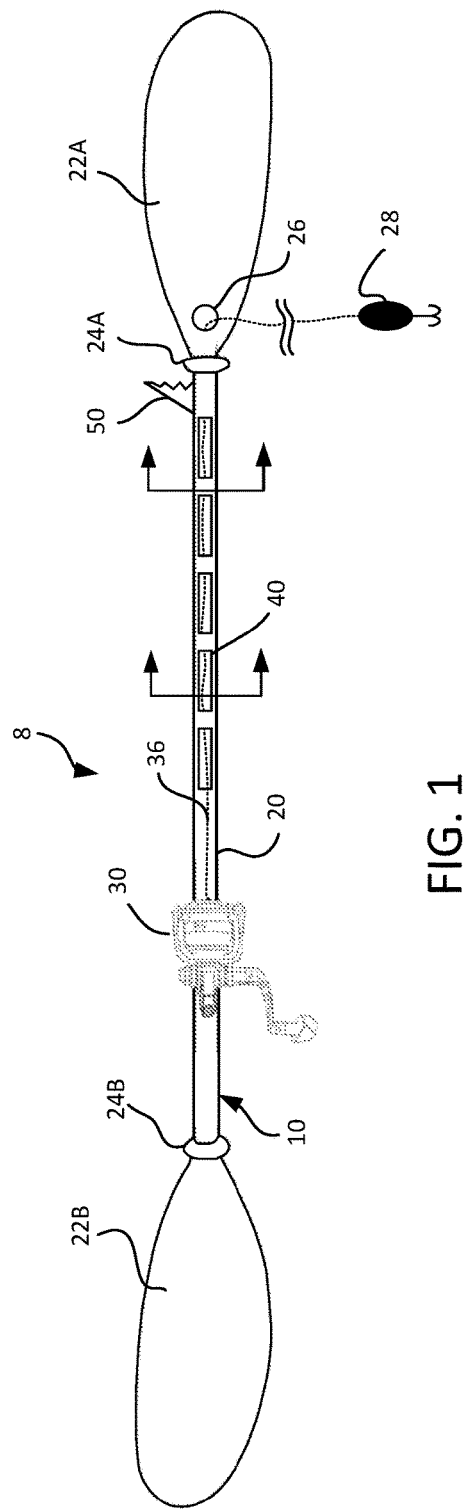
FIG. 1 illustrates a top view of a combination double-ended paddle and fishing rod having a recessed channel.
Figure 2:
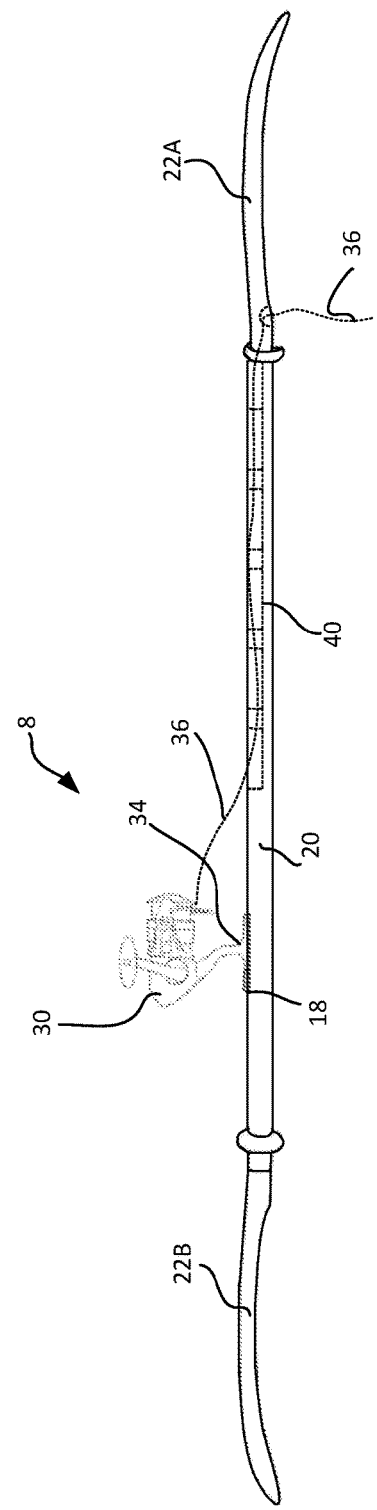
FIG. 2 illustrates a side view of the combination double-ended paddle and fishing rod of FIG. 1.

FIGS. 1 and 2 illustrates a first embodiment of a combination paddle and fishing rod device 8. The combination paddle and fishing rod device 8 allows a user to, inter alia, troll for fish while propelling a watercraft through water. Alternatively, a user may utilize the device 8 to fish independent of a paddling. In the illustrated embodiment, the device 8 utilizes a double-ended paddle 10 having a shaft 20 that extends between first and second oar blades 22a, 22b (hereafter 22 unless specifically referenced). In various arrangements, the shaft may be a two-piece shaft that utilizes a spring pin and aperture to connect the two pieces of the shaft together (See e.g., FIG. 13). Such two-piece shaft are known in the paddling industry. Further, the shaft may include drip collars 24a, 24b. See FIGS. 1 and 2.

To utilize the device 8 for fishing, the shaft 20 of the paddle 10 is configured to mount a fishing reel 30. In this regard, the shaft 20 of the paddle 10 includes a reel seat 18 attached to the shaft between the oar blades 22, 24. The reel seat 18 is configured to removably attach a fishing reel 30 to the paddle 10. The reel seat 18 may be a universal reel seat with any of a variety of reel types. The reel 30 may be releasably engageable with the reel seat 18 in a known manner. For example, the reel seat 18 may include a threaded ring (not shown) that slides over and secures a foot 34 of the reel 30 onto the shaft 20. The reel seat 18 may be permanently or removably affixed to the shaft 10. In this regard, different reel seats may be utilized to mount different types of reels to the shaft. In an alternate arrangement, the shaft 10 may include an indentation (not shown) in which the reel sits.

Figure 3:
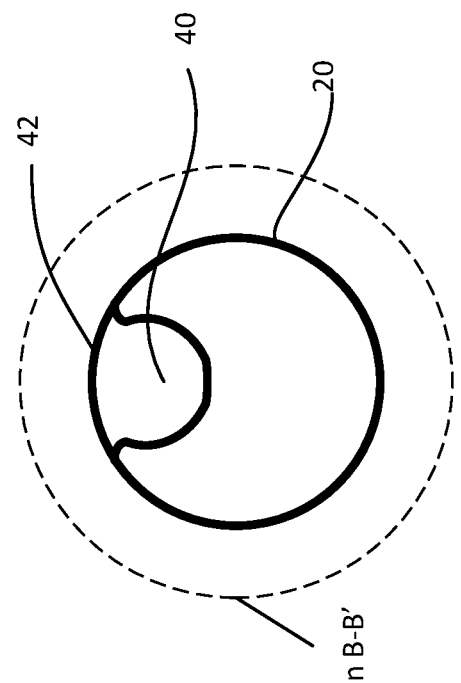
FIG. 3 illustrates two cross-sectional views of the paddle shaft of FIG. 1.
Figure 3:
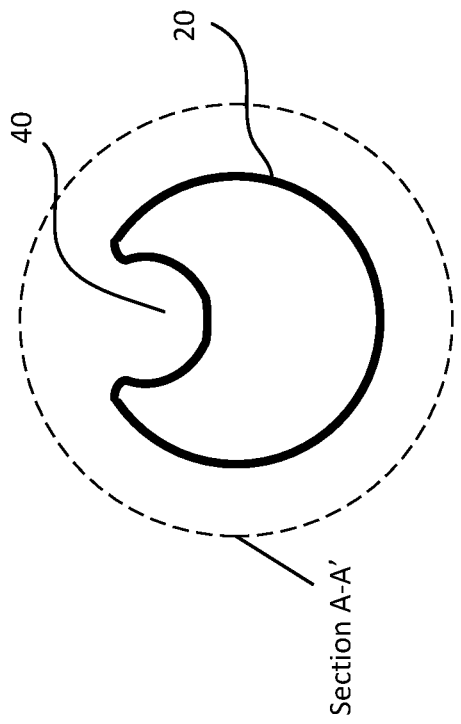

When the fishing reel 30 is mounted to the shaft 20, fishing line 36 extends from the reel 30 to one of the oar blades 22. In the present embodiment, the fishing line 36 is disposed within a recessed channel 40 that extends over at least a portion of the length of the shaft between the reel 30 one of the oar blades 22. See, e.g., FIGS. 2 and 3A. The recessed channel maintains the fishing line 36 against the shaft 20 of the paddle 10 while permitting a user to grasp the shaft for paddling. That is, when the fishing line 36 is disposed within the recessed channel 40 a user may grasp the shaft without contacting the fishing line. In order to maintain the fishing line within the channel 40, one or more ferrules 42 (or other elements including eyelets) extends over the channel 40 as shown best shown in FIG. 3. These ferrules 42 may be separately formed elements that are fixedly attached to the shaft 20. Alternatively, the ferrules may be integrally formed with the shaft 20. In one arrangement, the ferrules 42 are disposed flush with the generally circular cross-section of the shaft 10 such that the ferrules 42 are smooth under a user's hand. However, this is not a requirement. In any case, the ferrules maintain the fishing line 36 within the channel 40.

In the illustrated embodiment, the fishing line extends out of an aperture 26 disposed proximate to the base of one of the oar blades 22. In this embodiment, the aperture 26 extends though the interior of the oar blade and opens to the channel 40 of the shaft to permit the fishing line to extend from the channel 40 into the oar blade 22 and out of the aperture 26. Once extending out of the aperture 26, the fishing line may be used to trail a baited hook or lure 28 behind a watercraft as a user paddles a watercraft.

FIGS. 1 and 2 are presented by way of illustration and not by way of limitation. Along these lines, it will be appreciated that variations may be made. For instance, while showing the channel 40 extending over only half of the shaft 20, it will be appreciated that the channel may extend the entire length of the shaft 20 between the two oar blades 22. In such an arrangement, the shaft may be extrusion molded, though this is not a requirement. The shaft may be made of any appropriate material including, without limitation, aluminum, polymers and/or composites. In another variation of the double-ended paddle embodiment, both oar blades may include an aperture 26 (not shown). In such an embodiment, a user may trail a lure from either oar blade. In a further variant, first and second reels 30 may be mounted to the shaft 20 to allow for trailing two hooks/lures from a watercraft.

FIG. 1 further illustrates an optional attached cutting edge 50. The cutting edge 50 is attached (e.g., riveted) to the shaft 20 near the oar blade through which the fishing line extends. The cutting edge allows a user to quickly discharge overweight marine species or free entanglements with submerged objects by cutting the line 36, when necessary.

Figure 4:
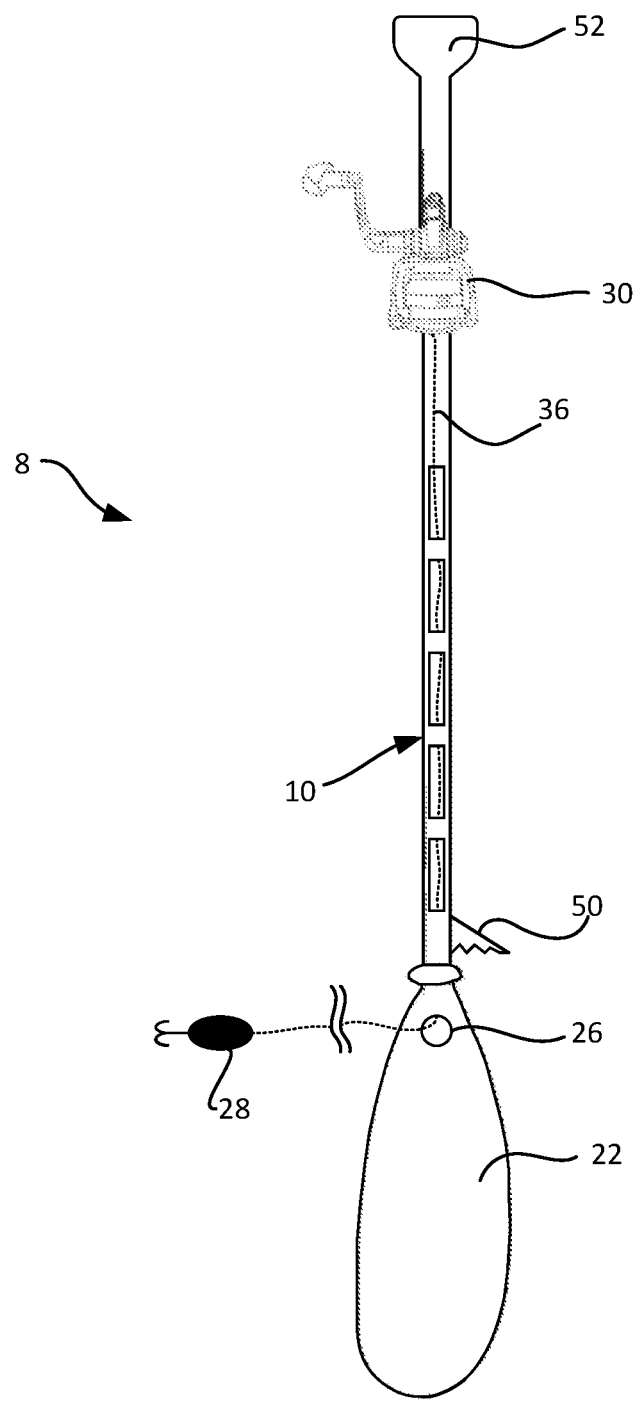
FIG. 4 illustrates a top view of a single-ended paddle and fishing rod having a recessed channel.

FIG. 4 illustrates another embodiment of the combination paddle and fishing rod device 8. In this embodiment, a single-ended paddle 10 is provided. As shown, this embodiment of the device 8 has a first oar blade 24 on a first end of the shaft 20 and a handle 52 on a second end of the shaft. The single-ended paddle 10 otherwise may be constructed in a manner similar or identical to that described above for the double ended paddle device.

Figure 5:
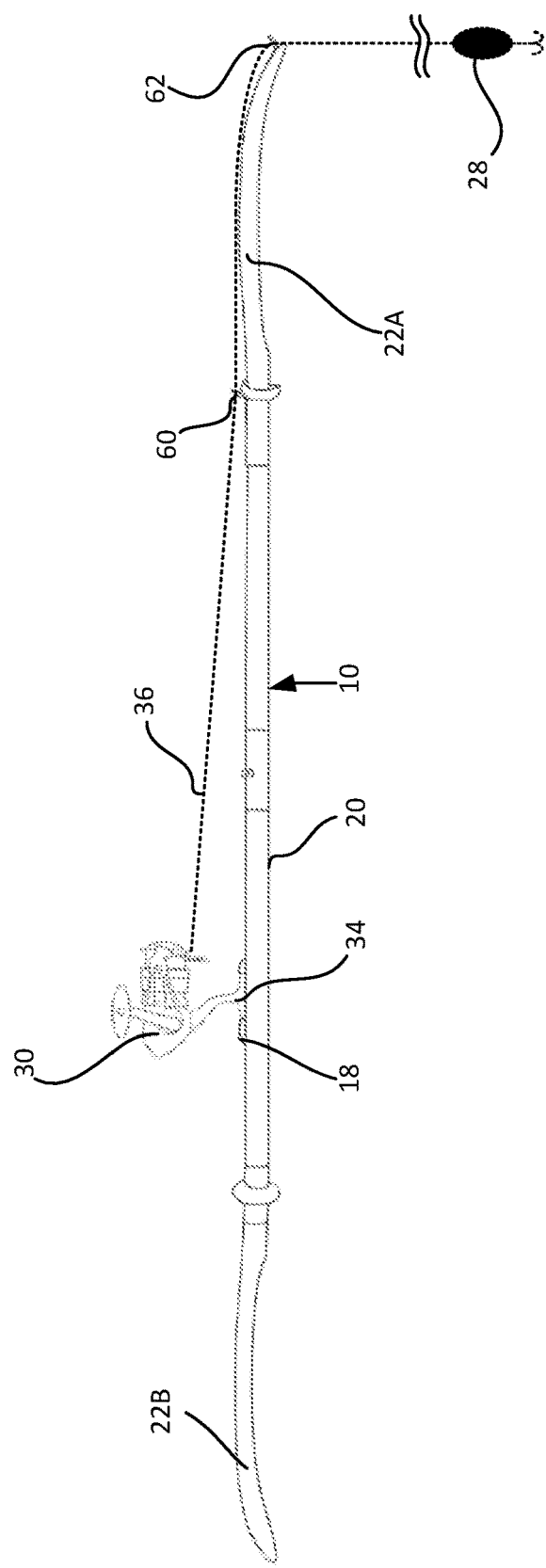
FIG. 5 illustrates another embodiment of a combination paddle and fishing rod having eyelets attached to the shaft and/or blade.
Figure 6:
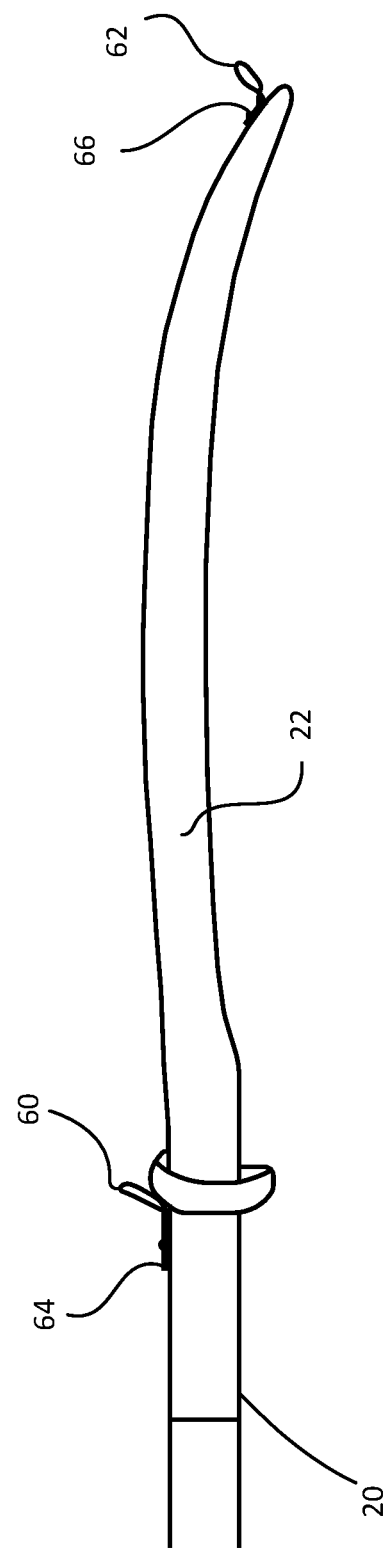
FIG. 6 illustrates a close-up view of the paddle of FIG. 5.

FIGS. 5 and 6 illustrates another embodiment of a combination paddle and fishing rod device 8 utilizing a double ended paddle 10. Like reference numbers are utilized to reference like elements to the paddle disclosed in previous figures. Similar to the embodiment of FIGS. 1 and 2, the paddle 10 has a shaft 20 that extends between first and second oar blades 22a, 22b and includes a reel seat/mount 18 for mounting a foot portion 34 of a fishing reel 30 to the shaft. However, rather than utilizing a recessed channel, this embodiment of the device 8 includes a first fishing line guide or eyelet 60 that is attached to the base of the oar blade 22 at a location proximate to the connection between the shaft 20 and the oar blade 22. As shown, the eyelet 60 has a base plate 64 that is attached to the oar blade 22. The base plate 64 may, but need not, be shaped to conform to the surface of the oar blade 20. In any configuration, the base plate 64 provides an area for securing the eyelet 62 to the oar blade and may be attached in any appropriate manner. Such attachment includes welding, adhering and/or use of mechanical connectors (e.g., rivets, screws, etc.). The first eyelet 60 is typically configured such that it extends above the surface of the oar blade such that, when the fishing line 36 extends between the reel 30 and the eyelet 60, a space exists below the line 36 and above the shaft 20, which allows a user to grasp the shaft 20 without contacting the line. Though illustrated as being attached to the oar blade, it will be appreciated that the first eyelet 60 may alternatively be affixed to the shaft 20. As a further embodiment, additional eyelets may be affixed along the length of the shaft.

A second eyelet 62 is attached to a distal end of the oar blade 24. As with the first eyelet, the second eyelet may include a base plate 66, which may be affixed to the oar blade in any appropriate manner. However, to increase the connection strength between the second eyelet 62 and the oar blade 22 the eyelet is typically affixed by a mechanical fastener that extends through the oar blade. The second eyelet 62 is sized to extend a desired distance above the surface of the oar blade and may extend a short distance beyond the distal tip of the oar blade. However, this is not a requirement. When a curved oar blade is utilized, the second eyelet 62 is typically attached to a convex surface (e.g., back surface) of the oar blade such that paddling forces are not directly applied to the eyelet 62. In a further embodiment, when mounting both eyelets to the oar blade, the oar blade may be configured to be removed from the shaft. In such an embodiment, a user may remove the oar blade and replace the oar blade with a standard oar blade when the paddle is not being used for fishing. In use, the flexibility of the oar blade may improve the ability of a user to cast a baited hook or lure 28.

Figure 7:
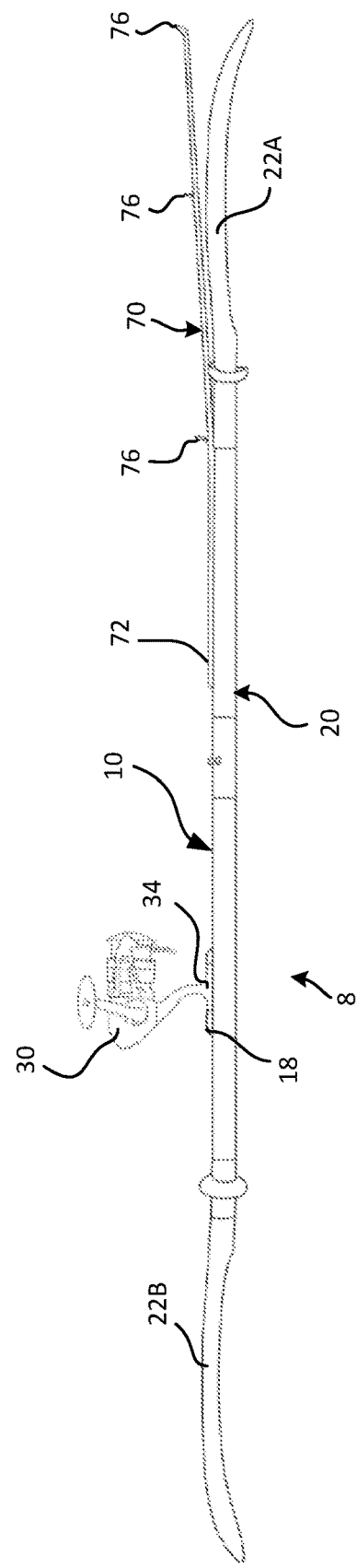
FIG. 7 illustrates another embodiment of a combination paddle and fishing rod having a short fishing rod attached to an end of the paddle.

FIGS. 7, 8A and 8B illustrate another embodiment of a combination paddle and fishing rod device 8 utilizing a double ended paddle 10. Like reference numbers are utilized to reference like elements to the devices disclosed in previous figures. Again, the device has a shaft 20 that extends between first and second oar blades 22 and includes a mount 18 for mounting a foot portion 34 of a fishing reel 30 to the shaft 20. In this embodiment, a section of fishing rod 70 is attached to the shaft 20. That is, a rearward portion 72 of the fishing rod 70 may be attached to the shaft 20. The rod 70 typically includes two or more eyelets 76 including at least a first eyelet near the connection between the rod 70 and the shaft 20 and a second eyelet near a tip of the rod 70. Additional eyelets may be attached to the rod section along its length. Typically, the rod section is sized to extend from its connection with the shaft to a location proximate to a distal end of the oar blade 22. Use of the separate rod section 70 provides additional ability for a user to cast a lure as well as providing flexibility when fighting/landing a fish.

As shown in FIGS. 8A and 8B, the rearward portion 72 of the rod 70 extends along a portion of the length of the shaft 20. In the present embodiment, shrink-wrapped tubing 75 extends over and around the shaft 20 and the rearward portion 72 of the rod 70. Once so disposed, the shrink-wrapped tubing 75 is heated to secure the rod 70 against the shaft 20. Though illustrated utilizing the shrink-wrap tubing, it will be appreciated that other connection means are possible and are considered within the scope of the present disclosure. For instance, any annular connector (e.g., hose clamp, ratchet clamp, etc.) may be utilized.

A forward portion of the rod 70 extends over and above the oar blade 22. In the illustrated embodiment, the oar blade 22 is a curved. More specifically, a back surface 23 (e.g., convex surface) of the oar blade 22 curves away from the rod 70. In this regard, the distal portion of the rod 70 is spaced away from the back surface 23 of the oar blade 22. Such spacing provided by the shape of the rod 70 and/or the oar blade 22 provides improved casting and feel for fishing purposes.

FIGS. 9A and 9B illustrate the combination paddle and fishing rod device 8 of FIG. 7 in use. As shown, fishing line 36 may extend from the reel 30 through the eyelets 76 of the rod section 70 to a location beyond the distal tip of the oar blade 22. This allows a user to easily cast a bait/lure 28 and/or troll the bait/lure 28 while paddling. In addition, the flexibility of the rod 70 allows the tip of the rod 70 to displace against the back surface 23 of the oar blade 22 (e.g., convex surface of a curved oar blade). In this regard, the oar blade 22 may provide support for the distal tip of the rod 70 when necessary.

FIGS. 10A and 10B illustrate a further embodiment of a combination paddle and fishing rod device 8. In this embodiment, a section of fishing rod 100 is configured for selective attachment to a paddle 10. As shown, the section of fishing rod 100 is adapted for receipt within a ferrule or socket 110 attached to the shaft 20 of the paddle 10. As shown, the socket 110 is a generally hollow element that is affixed proximate to an end of the shaft 20. In the illustrated embodiment, the socket 110 includes a base 112 the may be secured to the shaft 20 in any appropriate manner. For instance, the base 112 may be adhered, welded and or mechanically affixed (e.g., screwed, riveted, etc.) to the shaft 20. The socket 112 has a hollow interior 114 that is sized to receive a matingly configured rearward portion 102 of the section of fishing rod 100. In this regard, a user may insert the rearward portion 102 of the section of fishing rod 100 into the hollow interior 114 of the socket 110 to attach the fishing rod section 100 to the paddle 10. See FIG. 10B.

Figure 11:
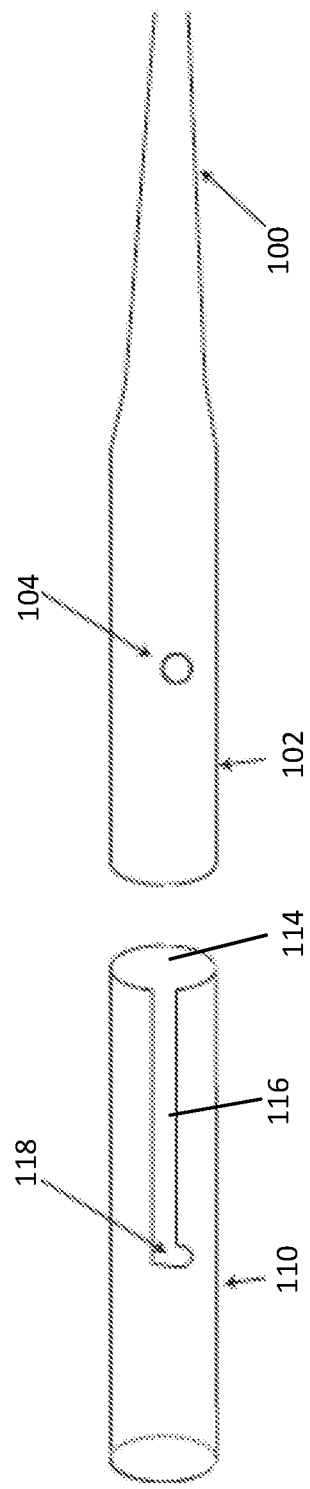
FIG. 11 illustrates a locking mechanism for use with the combination paddle and fishing rod of FIGS. 10A and 10B.

Various different attachment mechanisms may be utilized to attach the section of fishing rod 100 within the socket 110. In its simplest form, the connection between the socket 110 and section of fishing rod 100 may be a simple interference fit. FIG. 11 illustrates a further non-limiting connection mechanism that may be utilized between the section of fishing rod 100 and the socket 110. As shown, the socket 110 includes a channel 116 that extends through its sidewall over a portion of its length. The channel is sized to receive a pin 104 affixed to the surface of the rearward section of the section of rod. When inserted into the socket, the pin 104 is received within the channel 116. The channel also includes a turn catch 118 at its terminal end. Upon the pin 104 reaching the terminal end of the channel 116, a user may twist the rod and thereby lock the section of rod within the socket.

As will be appreciated, this embodiment allows a user to conveniently attach and detach a section of fishing rod to and from a paddle when desired. Further, the present embodiment allows a user the ability to select among different fishing rod sections. That is, different fishing rod sections having different strengths/weights may be secured to the paddle. By way of example, a user may select between sections of rods having small, medium and large diameters and/or sections of rods having differing lengths. Each such section of rod may include a standardized rearward portion that is configured to be received within the socket.

Figure 12:
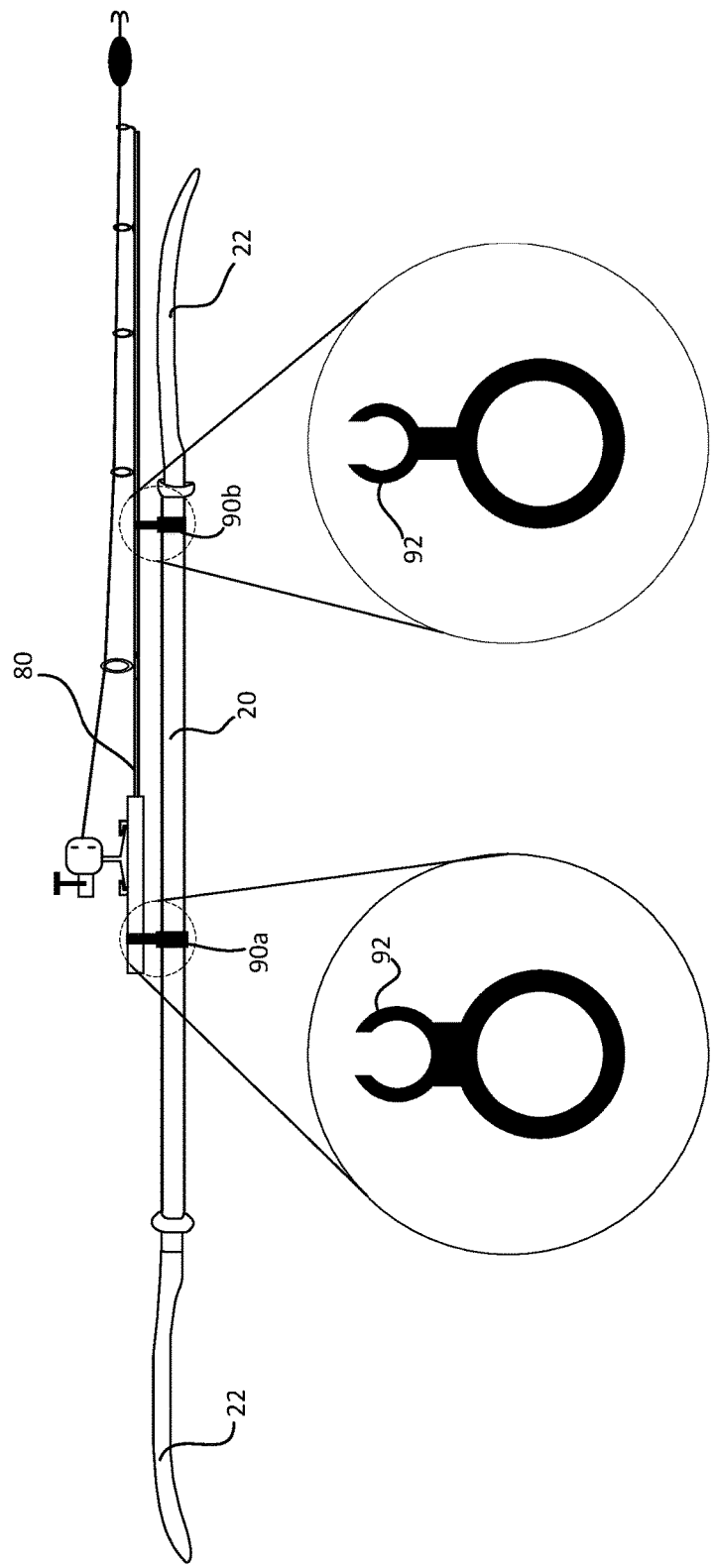
FIG. 12 illustrates another embodiment of combination paddle and fishing rod that allows mounting an existing rod to an oar shaft.

FIG. 12 illustrates another embodiment of a double ended paddle 10 having a shaft 20 that extends between first and second oar blades 22. In this embodiment, an existing fishing rod 80 is attached to the shaft 20 utilizing first and second connectors 90a, 90b (90 unless specifically referenced). As shown, the illustrated embodiment of the connectors 90 are sized to be secured about the shaft at first and second locations. Each connector 90 has a split ring/snap fit aperture 92 that is sized to engage a portion of the fishing rod 80. For instance, one connector 90a may have a snap connector 92 that is sized to engage over a handle 82 of the fishing rod 80. In contrast, the other connector 90b may have a smaller snap connector 92 that is sized to engage the rod itself. Other connectors are possible and within the scope of the presented invention. Preferably any connector allows for conveniently attaching and detaching the rod to the oar shaft. A similar configuration may be utilized to attach a partial rod section to an oar shaft.

Figure 13:
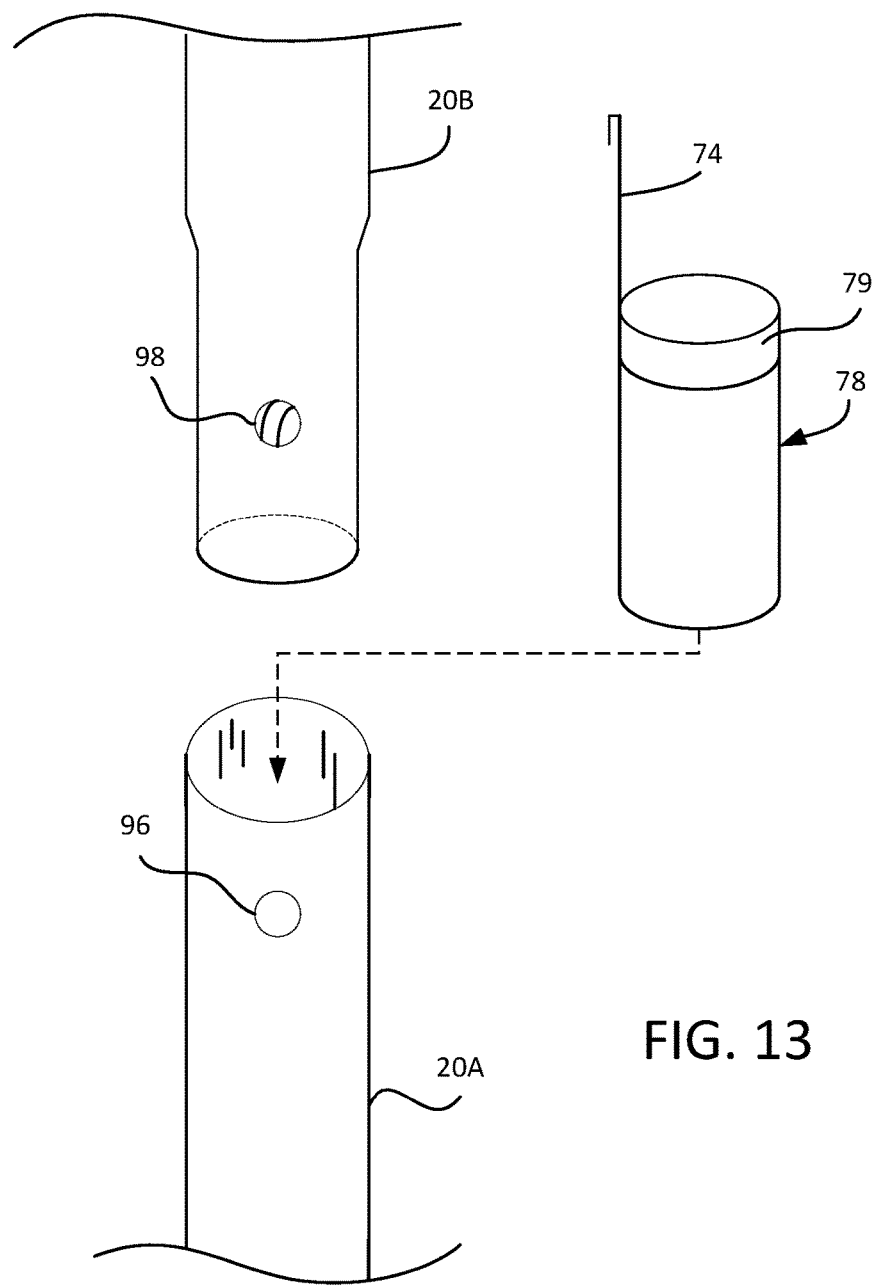
FIG. 13 illustrates an insert for disposition within a paddle shaft.

FIG. 13 illustrates an accessory that could be utilized in any two-piece shaft configuration of the embodiments disclosed above. More specifically, FIG. 13 illustrates a "Tackle in a Tube" cylindrical insert 78 used for storage of line, hooks and lures. As shown, the insert 78 is configured for insertion within a two piece shaft 20A, 20B, which could be part of a double-ended paddle or a single-ended paddle. As shown, one of the shafts 20A has a pin aperture 96 that receives a spring pin 98 attached to the other end of the other shaft 20B when the shafts are connected. In this regard, one of the shafts (e.g., 20B) has an end sized to be received in the interior of the other shaft (e.g., 20A). As shown, the cylindrical insert 78 is disposable within the interior of the receiver shaft 20A. The insert 78 may include a lid 79 that allows user to open and close the insert and/or seal the insert. In the present embedment, the insert has a tab 77 that limits its disposition within the receiving shaft 20A and allows for convenient removal from the shaft.

It will be appreciated that in all of the disclosed embodiments the shaft is considered novel in and of itself. That is, the various embodiments of the shaft could be sold separate from the oar blades allowing a user to attach any desired oar blade(s). Further, the oar blade(s) may be removable to allow a user to use the shaft alone as a fishing pole and/or place the end of the oar shaft in an existing rod holder. In this arrangement, a reel mount may be disposed proximate to one end of the shaft to provide a longer rod to provide, for example, improved casting distance.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A device for combined use in propelling a watercraft through water and fishing, comprising:
    an elongated shaft having a first end and a second end;
    at least a first oar blade attached to one of said first end and said second end of said elongated shaft;
    a flexible rod having a rearward portion connected to an outside surface of said the elongated shaft proximate to a connection point between said elongated shaft and said first oar blade, wherein a tip end of said flexible rod extends over at least a portion of said first oar blade free of connection to said oar blade, said flexible rod having at least first and second eyelets;
    a fishing reel mount disposed along the length of said elongated shaft and positioned to permit fishing line extending from a fishing reel mounted to said fishing reel mount to extend through said first and second eyelets.

2. The device of claim 1, wherein said rearward portion of said flexible rod is fixedly connected to said elongated shaft.

3. The device of claim 2, further comprising:
    at least a first annular connector disposed around said rearward portion of said flexible rod and said elongated shaft.

4. The device of claim 2, wherein said annular connector comprises a section of shrink-wrap tubing.

5. The device of claim 1, wherein said rearward portion of said flexible rod is removably connected to said elongated shaft.

6. The device of claim 1, further comprising:
a socket having an at least partially hollow interior fixedly attached to said elongated shaft proximate to said first oar blade, wherein said rearward portion of said flexible rod is sized for at least partial receipt within said hollow interior of said socket.

7. The device of claim 6, further comprising:
a mechanical connector attached to one of said socket and said flexible rod for mechanical engagement with the other of said socket and said flexible rod.

8. The device of claim 1, wherein said first oar blade is curved having a concave surface and a convex surface.

9. The device of claim 1, wherein said flexible rod is connected to said elongated shaft such that it extends over at least a portion of said convex surface of said first oar blade.

* * * * *